United States Patent
Gresham

(10) Patent No.: US 7,653,053 B2
(45) Date of Patent: Jan. 26, 2010

(54) PROGRAMMABLE BIT RATES IN A CONSTANT BANDWIDTH TDM SWITCH

(75) Inventor: Paul Gresham, Arnprior (CA)

(73) Assignee: Zarlink Semiconductor Inc., Kanata, ON (CA)

(*) Notice: Subject to any disclaimer, the term of this patent is extended or adjusted under 35 U.S.C. 154(b) by 753 days.

(21) Appl. No.: 10/888,998

(22) Filed: Jul. 13, 2004

(65) Prior Publication Data
US 2005/0025138 A1 Feb. 3, 2005

(30) Foreign Application Priority Data
Jul. 29, 2003 (GB) ................................ 0317672.4

(51) Int. Cl.
*H04L 12/50* (2006.01)
(52) U.S. Cl. ..................................................... 370/366
(58) Field of Classification Search ......... 370/357–359, 370/366, 369, 370, 535–545, 372, 375, 387–388
See application file for complete search history.

(56) References Cited

U.S. PATENT DOCUMENTS

| | | | |
|---|---|---|---|
| 3,914,553 A * | 10/1975 | Melindo et al. ............. 370/535 |
| 4,510,597 A | 4/1985 | Lewis | |
| 6,507,579 B1 | 1/2003 | Gresham | |
| 6,754,241 B1 * | 6/2004 | Krishnamurthy et al. .... 370/537 |
| 7,106,967 B2 * | 9/2006 | Handelman .................. 398/47 |
| 2001/0055322 A1 * | 12/2001 | Domon ....................... 370/537 |
| 2003/0053491 A1 * | 3/2003 | Andrew ...................... 370/535 |

* cited by examiner

*Primary Examiner*—Kwang B Yao
*Assistant Examiner*—Tung Q Tran
(74) *Attorney, Agent, or Firm*—S. Mark Budd; Marks & Clerk

(57) ABSTRACT

A method and a TDM digital switch are provided for switching data at a variety of data rates. Input streams having a data rate less than the maximum data rate of the switch are grouped and multiplexed to form multiplexed streams carrying data at the maximum data rate. A switching state machine switches the data from each input stream to form grouped output streams comprising multiplexed output streams, each grouped output stream carrying data at the maximum data rate. The grouped output streams are demultiplexed, and the output streams transmitted through respective output shift registers. The method and TDM digital switch allow streams with programmable data rates to be switched while still maximizing use of resources, including memory, within the switch.

19 Claims, 11 Drawing Sheets

```
module ip_shift(CLK, LDen, BSHFT, STI, HR);
input CLK, LDen, BSHFT, STI;
output [7:0] HR;
reg [7:0] HR;
reg [6:0] SR;
always @(posedge CLK) if (BSHFT) begin
        SR <= {SR, STI};
        if (LDen) HR <= {SR, STI};
end
endmodule
```

FIG. 4

```
reg[7:0] GroupA_HR[0:31], GroupB_HR[0:31], GroupC_HR[0:31], GroupD_HRDR[0:31];
reg[6:0] sel_time;
reg[2:0] rate_code[0:31];
parameter M65MBS = 2'b00, M32MBS = 2'b01, M16MBS=2'b10;
always @(posedge clk) case(sel_time[1:0])
    casxe({rate_code[sel_time[4:10]], sel_time[6:5])
        {M65MBS, 2'bxx}: to_data_memory <= GroupA_HR(sel_time[4:0]);
        {M32MBS, 2'bx0}: to_data_memory <= GroupA_HR(sel_time[4:0]);
        {M32MBS, 2'bx1}: to_data_memory <= GroupB_HR(sel_time[4:0]);
        {M16MBS, 2'b00}: to_data_memory <= GroupA_HR(sel_time[4:0]);
        {M16MBS, 2'b01}: to_data_memory <= GroupB_HR(sel_time[4:0]);
        {M16MBS, 2'b10}: to_data_memory <= GroupC_HR(sel_time[4:0]);
        {M16MBS, 2'b11}: to_data_memory <= GroupD_HR(sel_time[4:0]);
    endcase
endcase
```

FIG. 5

| | | | | | | |
|---|---|---|---|---|---|---|
| HRA(n) | HRA(n+1) | HRA(n+2) | HRA(n+3) | HRA(n+4) | HRA(n+5) | - - - |
| HRA(n) | HRB(n) | HRA(n+1) | HRB(n+1) | HRA(n+2) | HRB(n+2) | |
| HRA(n) | HRB(n) | HRC(n) | HRD(n) | HRA(n+1) | HRB(n+1) | |
| ⋮ | | | | | | |

FIG. 6

| | | | | | | |
|---|---|---|---|---|---|---|
| SRCA(n) | SRCA(n+1) | SRCA(n+2) | SRCA(n+3) | SRCA(n+4) | SRCA(n+5) | - - - |
| SRCA(n) | SRCB(n) | SRCA(n+1) | SRCB(n+1) | SRCA(n+2) | SRCB(n+2) | |
| SRCA(n) | SRCB(n) | SRCC(n) | SRCD(n) | SRCA(n+1) | SRCB(n+1) | |
| ⋮ | | | | | | |

FIG. 7

```
reg[7:0] reg_file[0:31], OP1[0:31], OP2[0:31], OP3[0:31], OP4[0:31];
wire[7:0] IP;
wire[4:0] sel_time;
integer i;
always @(posedge CLK) being
        reg_file[sel_time] <= IP;
        if (&sel_time) for (i=0; i<=31; i=i+1) begin
                OP1[i] <= reg_file[i];
                OP1[31] <= IP;
                OP2[i] <= OP1[i];
                OP3[i] <= OP2[i];
                OP4[i] <= OP3[i];
        end
end
```

FIG. 10

```
wire[6:0] sel_time;
reg[31:0] LDen, SHFTen;
reg[1:0] stream_rate[0:31];
parameter M65MBS = 2'b00, M32MBS = 2'b01, M16MBS = 2'b10;
integer n;
always @(posedge CLK) begin
        LDen <= 32'h0; SHFTen <= 32'h0;
        for (n=0; n<=31; n=n+1) begin
                case(stream_rate[n])
                        M65MBS: SHFTen[n] <= 1'b1;
                        M32MBS: SHFTen[n] <= ~sel_time[0];
                        M16MBS: SHFTen[n] <= (sel_time[1:0] == 2'b10);
                endcase
                if (sel_time[4:0] == 5'd14) case(stream_rate[n])
                        M65MBS: LDen[n] <= 1'b1;
                        M32MBS: LDen[n] <= sel_time[5];
                        M16MBS: LDen[n] <= &sel_time[6:5];
                endcase
        end
end
```

FIG. 11

```
module op_shift(CLK, LDen, IP_HR, BSHFT, STO);
input CLK, LDen, BSHFT;
input[7:0] IP_HR;
output STO;
reg[7:0] SR;
wire STO = SR[7];
always @(posedge CLK) if (BSHFT) begin
      SR <={SR, 1'b0}
      if (LDen) SR <= {IP_HR}
end
endmodule
```

FIG. 12

```
reg[31:0] GroupB_enable, GroupCandD_enable;
reg[1:0] stream_rate[0:31];
parameter M65MBS = 2'b00, M32MBS = 2'b01, M16MBS=2'b10;
integer n;
always @(posedge CLK)
      for (n=0; n<=31; n=n+1) begin
            GroupB_enable[n] <= stream_rate[n] != M65MBS);
            GroupCandD_enable[n] <= (stream_rate[n] == M16MBS);
      end
```

FIG. 13

PROGRAMMABLE BIT RATES IN A CONSTANT BANDWIDTH TDM SWITCH

FIELD OF THE INVENTION

The invention relates to digital telecommunication systems, and in particular to digital switching within such systems.

BACKGROUND OF THE INVENTION

A Time Division Multiplexing (TDM) digital switch typically contains three main components. A data memory receives and stores data received from serial input streams. A connection memory stores the desired connection paths and connection characteristics. A hardware switching unit sequentially reads the connection memory, and then transfers the data from the data memory to output streams according to the desired connection characteristics. This is fundamentally how the digital switching components of the switches described in U.S. Pat. No. 4,510,597, issued to Lewis on Dec. 3, 1981, and in U.S. Pat. No. 6,507,579 issued to Gresham on Jun. 25, 1999, work.

The digital switches taught by '597 and '579 switch input streams having a constant data rate. With the evolution of digital switches and the creation of standards for formatting of serial streams, TDM digital switches commonly incorporate features that provide a programmable serial data rate, thereby allowing a more versatile interface. For example, the MT90869™ digital switch produced by Zarlink Semiconductor Inc., allows programmable data rates.

However, simply varying the data rate of input streams can lead to underutilization of connection memory and data memory. The data memory and the connection memory of a device must be large enough to carry the data with streams operating at a maximum rate. If the data rates of the streams are reduced, portions of the data memory and of the connection memory will remain unused. The digital switch will therefore be operating below maximum capacity, and the traffic through the device will be reduced. For example, if the data rate of each stream is reduced to half the maximum data rate, only half the data memory will be in use at any time.

This loss of bandwidth and redundancy of memory at lower data rates is normally considered part of the cost of the feature of providing programmable input and output data rates. A digital switch that allowed programmable data rates in the serial input and output streams while using as much connection memory and data memory as possible would result in improved bandwidth utilization.

SUMMARY OF THE INVENTION

In accordance with one aspect of the invention, a method is provided for switching a plurality of parallel input streams to a plurality of parallel output streams, each parallel input stream having an input data rate not greater than a maximum data rate, the method comprising the steps of: grouping the parallel input streams into a plurality of subsets, the parallel input streams in each subset having a common input data rate associated with the subset, at least one subset having an input rate less than the maximum data rate and less than the input data rate of at least one other parallel input stream; for each subset having an input data rate less than the maximum data rate, multiplexing the parallel input streams within the subset to generate a grouped input stream; determining a mapping between the parallel input streams and the parallel output streams; generating a plurality of grouped output streams from the mapping such that each grouped output stream includes data from at least one parallel input stream; and for each grouped output stream which includes data from at least two parallel input streams, demultiplexing the grouped output stream to generate a plurality of parallel output streams.

In accordance with another aspect of the invention, a time division multiplexing (TDM) digital switch is provided, the TDM digital switch being adapted to receive a plurality of serial input streams and to transmit a plurality of serial output streams, each serial input stream having a respective input data rate not greater than a maximum data rate, the TDM digital switch comprising: a plurality of input shift registers, each for receiving a corresponding one of the serial input streams and generating a corresponding parallel input stream, each parallel input stream belonging to one of a plurality of parallel input stream subsets (PIS subsets); a plurality of output shift registers, each for receiving a corresponding parallel output stream and transmitting a corresponding one of the serial output streams at a respective output data rate; a data selector for multiplexing the parallel input streams in each PIS subset which includes more than one parallel input stream, to generate a corresponding grouped input stream, each grouped input stream thereby being associated with one of the PIS subsets; means for generating at least one grouped output stream, each grouped output including data from at least two of the parallel input streams; and means for demultiplexing each grouped output stream to generate a subset of parallel output streams, thereby associating each output shift register with one of the grouped output streams.

The digital switch of the present invention allows data rates into and out of the digital switch to be varied, without reducing bandwidth and without leaving memory resources unused. By increasing the number of I/O pins for a given memory size and maximum data rate and by time division multiplexing and demultiplexing data, additional data can enter the switch as the data rate is lowered on some pins, thereby loading data into the data memory at the maximum rate. The invention can be incorporated into a digital switch without substantially affecting how a traditional switching state machine and connection memory interoperate to switch data.

BRIEF DESCRIPTION OF THE DRAWINGS

The features and advantages of the invention will become more apparent from the following detailed description of the preferred embodiment(s) with reference to the attached figures, wherein:

FIG. 4 is a listing of Verilog code executed by each input shift register of FIG. 1 according to one embodiment of the invention;

FIG. 5 is a listing of Verilog code executed by the data selector of FIG. 1 according to one embodiment of the invention;

FIG. 6 is a diagram of a data structure within the data memory of FIG. 1 used to store data received by the input shift registers according to one embodiment of the invention;

FIG. 7 is a diagram of a data structure within the connection memory of FIG. 1 used to store connection addresses according to one embodiment of the invention;

FIG. 10 is a listing of Verilog code executed by the output holding register of FIG. 1 according to one embodiment of the invention;

FIG. 11 is a listing of Verilog code executed by the output load control of FIG. 1 according to one embodiment of the invention;

FIG. 12 is a listing of Verilog code executed by the output shift registers of FIG. 1 according to one embodiment of the invention;

FIG. 13 is a listing of Verilog code executed by the enabling circuit of FIG. 1 according to one embodiment of the invention.

It will be noted that in the attached figures, like features bear similar labels.

DETAILED DESCRIPTION OF THE EMBODIMENTS

Figure 1:
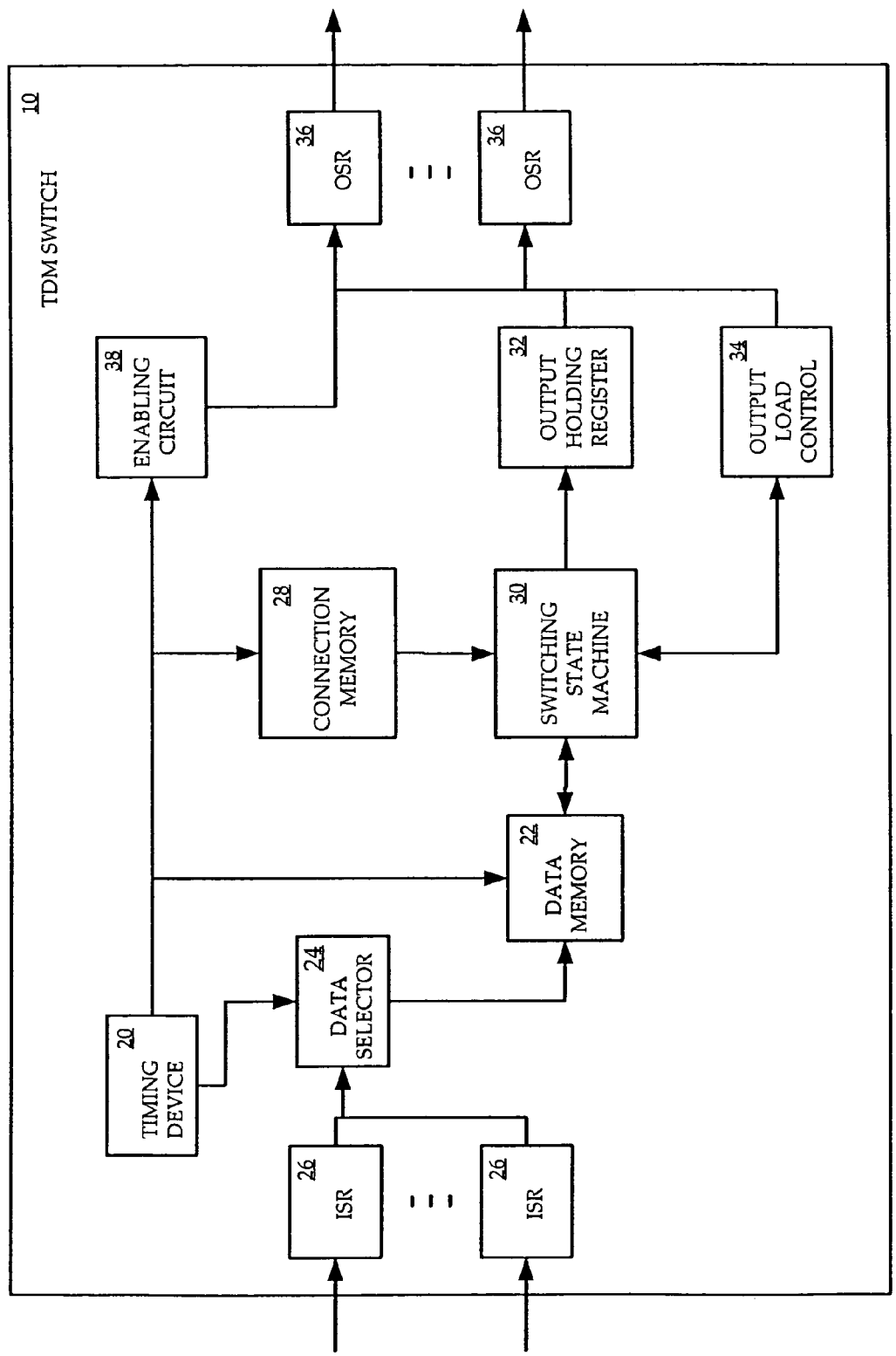
FIG. 1 is a block diagram of a Time Division Multiplexing (TDM) digital switch according to one embodiment of the invention.

Referring to FIG. 1, a Time Division Multiplexing (TDM) digital switch 10 in accordance with a preferred embodiment of the invention is shown. The TDM digital switch 10 includes a timing device 20, a data memory 22 coupled to the timing device 20, a data selector 24 coupled to the timing device 20 and to the data memory 22, and a plurality of input shift registers (ISRs) 26, each ISR 26 being coupled to the data selector 24. The TDM digital switch 10 also includes a connection memory 28 coupled to the timing device 20 and a switching state machine (SSM) 30, the SSM 30 being coupled to the timing device 20, to the data memory 22, and to the connection memory 28. The SSM 30 is coupled to an output holding register (OHR) 32 and to an output load control (OLC) 34. The OHR 32 and the OLC 34 are each coupled to each of a plurality of output shift registers (OSRs) 36. An enabling circuit 38 is coupled to each of the OSRs 36 and to the timing device 20.

In the preferred embodiment, each of the components of the TDM digital switch 10 shown in FIG. 1 is located within a single semiconductor device. The semiconductor device includes input pins (not shown), each coupled to a respective ISR 26, and includes output pins (not shown), each coupled to a respective OSR 36.

For the purposes of example only, the method and apparatus of the invention will be described with reference to a semiconductor device having 128 input pins and 128 output pins, and having a capacity of 32,768 channels. Data rates of 65 MB/s, 32 MB/s, and 16 MB/s will be assumed. Streams at data rates of 65 MB/s contain 1024 timeslots. Streams at data rates of 32 MB/s contain 512 timeslots. Streams at 16 MB/s contain 256 timeslots. At 32,768 channels the digital switch can process up to 32 streams at 65 MB/s each. It is to be understood that the invention applies equally well to TDM digital switches of different capacities and data rates.

The timing device 20 contains a binary counter. It receives as input a primary clock and an input frame pulse, each of which is associated with a TDM bus (not shown in FIG. 1). The timing device 20 uses the primary clock and the frame pulse to establish a binary timing signal that accurately corresponds to a relative position within a frame. In the example TDM switch, the binary counter is a 14 bit counter that is cleared on the boundary of each frame and then counts by one, every 7.63 ns, to a maximum count of 16383, at the end of each frame. This effectively divides each frame into 16,384 pieces. The binary counter is used to sequence all relevant events in the switch.

Each ISR 26 samples any corresponding input serial data at any of a set of programmable data rates, including a maximum data rate, and converts the input serial data into an 8 bit parallel signal. Not all ISRs 26 need receive input data at all times. ISRs that receive input data are referred to herein as active ISRs.

The data selector 24 acts essentially as a large multiplexer. It takes as input the parallel signals from the active ISRs 26, and receives the binary timing signal from the timing device 20. It uses the binary timing signal to sequentially select 8 bit parallel signals from each of the active ISRs 26, and applies the 8 bit parallel signals in sequence to the data memory 22.

The data memory 22 stores data received from the data selector 24, and provides selected data to the SSM 30 when requested to do so.

The connection memory 28 stores corresponding connection data for each timeslot of each OSR 36. The connection data identifies from where and how data for that timeslot and OSR 36 is to be taken. A mechanism (not shown in FIG. 1) is provided for storing data in the connection memory 28. For example, a microprocessor port may be used to allow data to be stored in the connection memory 28, although anyone skilled in the art can develop a suitable interface to load the connection memory 28.

The SSM 30 reads connection data from the connection memory 28 for each timeslot and OSR 36 in turn, applies the connection data to the data memory 22, reads a data byte from the data memory 22 (as described below), and sends the data byte to the OHR 32.

The OHR 32 acts essentially as a demultiplexer. The OHR 32 includes an addressable register file with a depth of one byte per stream, and which sequentially stores all the multiplexed data received from the SSM 30.

The OLC 34 passes output control signals to the OSRs 36, indicating to each OSR 36 when to process data received from the OHR 32 and when to generate serial output data bytes.

The enabling circuit 38 sends group enable signals to turn off and on transmission of any output serial data from certain OSRs 36, as described below with reference to FIG. 9.

Each OSR 36 samples any corresponding 8 bit parallel data received from the OHR 32 and converts it to serial form, then loads the data onto a corresponding serial output at one of the programmable data rates. Not all OSRs will load data onto a serial output, as described below with respect to the enabling circuit 38. OSRs which load data onto a serial output are referred to herein as active OSRS.

Figure 2:
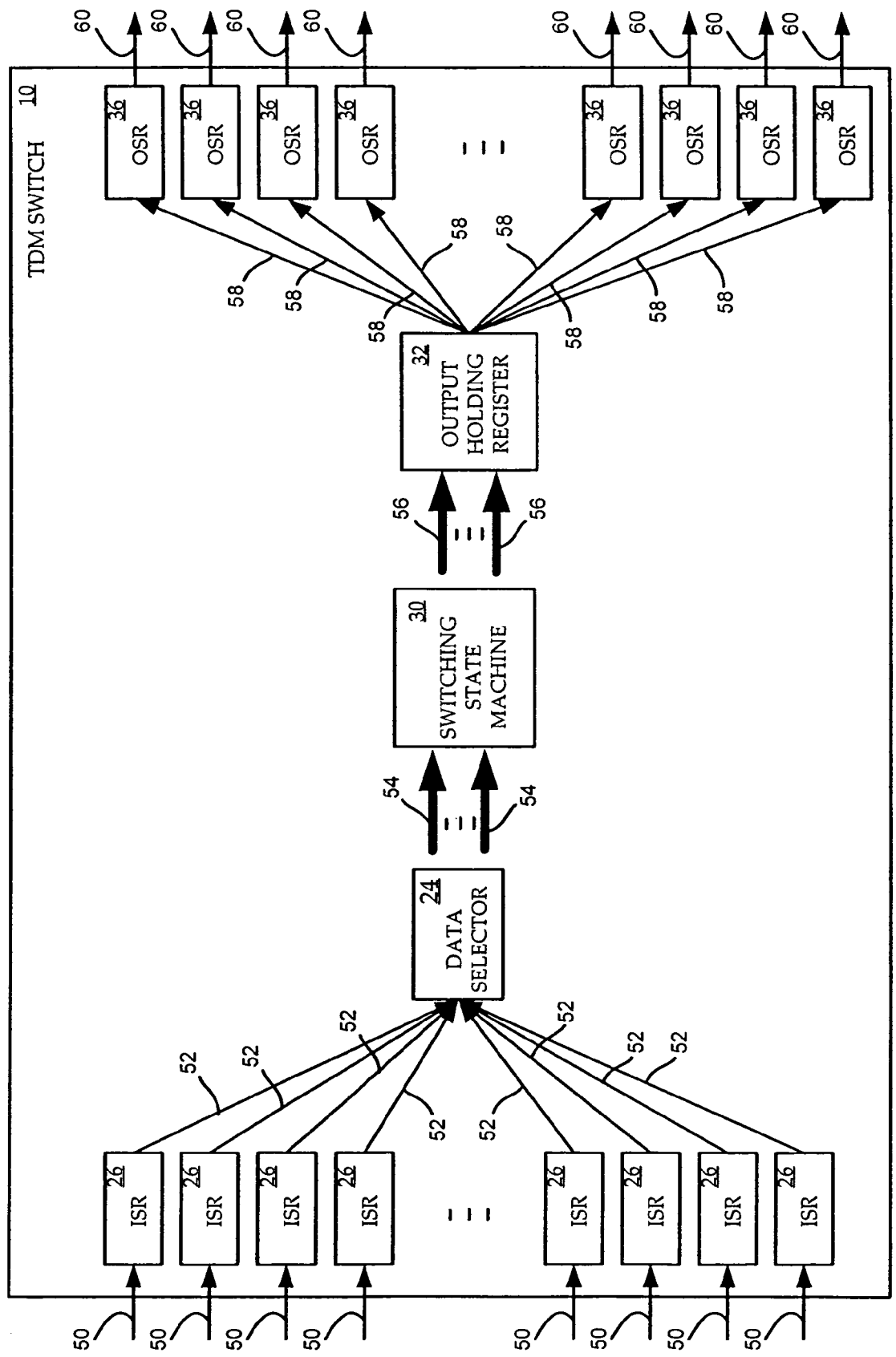
FIG. 2 is a high level block diagram of the TDM digital switch of FIG. 1.

Referring to FIG. 2, a high level block diagram of the TDM digital switch 10 of FIG. 1 is shown. ISRs 26 are grouped into ISR groups, each ISR group consisting of four ISRs. Each active ISR 26 receives a serial input stream 50 and generates a parallel input stream 52 as described below. For each ISR group, the data selector 24 multiplexes each parallel input stream 52 into a grouped input stream 54 having an internal data rate. The internal data rate is preferably equal to the maximum data rate. In the example embodiment, there are 32 grouped input streams 54 with internal data rates of 65 MB/s. The data selector 24 passes the grouped input streams to the SSM 30. Each grouped input stream is associated with four ISRs (one to four of which are active ISRs), one ISR group, and one to four parallel input streams. Each active ISR within an ISR group receives a serial input stream at a common input rate, which may be any of the set of programmable data rates up to and including the maximum data rate. Each grouped input stream therefore has an associated input data rate, which need not be the same as the internal data rate of the grouped input stream.

The SSM 30 maps each parallel input stream to a corresponding active OSR 36 and generates grouped output streams 56 which are sent to the OHR 32, each grouped output stream having the internal data rate. The internal data rate is the same as that of the grouped input streams, and is preferably equal to the maximum data rate. In the example embodiment, there are 32 grouped output streams 56 with internal data rates of 65 MB/s. The OHR 32 demultiplexes the grouped output streams 56, extracting one to four parallel output streams 58 from each grouped output stream 56. Each parallel output stream 58 is passed to a corresponding active OSR 36. Each active OSR 36 converts the corresponding parallel output stream to serial form, and transmits the data therein as a serial output stream 60 at an output data rate. The OSRs 36 are grouped into OSR groups, each OSR group containing four OSRs. Each of the one to four parallel output streams in a grouped output stream is sent to a respective OSR in the same OSR group. Each active OSR within an OSR group transmits a serial output stream at a common output data rate, which may be any of the set of programmable data rates up to and including the maximum data rate. Each grouped output stream therefore has an associated output data rate, which need not be the same as the internal data rate of the grouped output stream.

Figure 3:
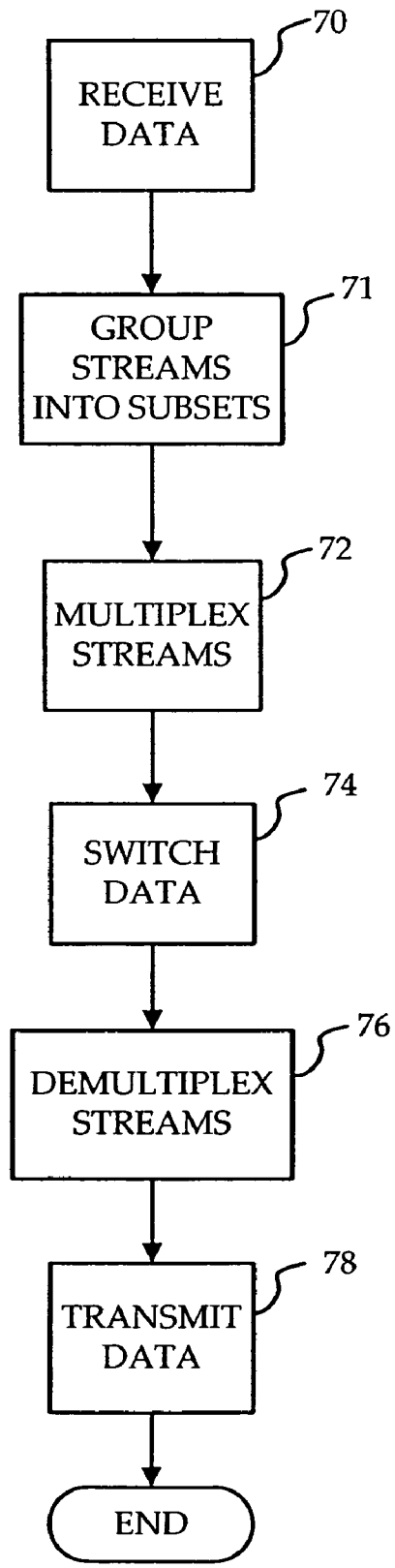
FIG. 3 is a flowchart of a method by which the TDM digital switch of FIG. 1 multiplexes and switches data streams according to one embodiment of the invention.

Referring to FIG. 3, a method by which the TDM digital switch 10 of FIG. 1 and FIG. 2 multiplexes and switches data streams according to one embodiment of the invention is shown. At step 70, each active ISR 26 receives a serial input stream and generates a parallel input stream therefrom. At step 71 the parallel input streams are grouped into subsets, each subset containing at least one parallel input stream. Each parallel input stream in a subset has the same input data rate. The subsets of parallel input streams are an abstraction of the ISR groups, each parallel input stream in a single subset originating from a different ISR in a single ISR group.

At step 72, the data selector 24 multiplexes the parallel input streams within each subset (that is, from each ISR group) into the respective grouped input stream. It should be noted that this "multiplexing" will be trivial for any grouped input stream having only one associated active ISR, as will happen for an ISR receiving a serial input stream at the maximum data rate. At step 74 the SSM 30 maps the parallel input streams to active OSRs, and generates grouped output streams. At step 76 the OHR 32 demultiplexes the grouped output streams into individual parallel output streams. Again, this "demultiplexing" will be trivial for any grouped output stream having only one associated active OSR, as will happen for an OSR operating at the maximum data rate. At step 78 each active OSR generates and transmits a serial output stream.

As stated above, each active ISR 26 reads input serial data at an input rate and outputs parallel input streams in 8 bit parallel form. One method of doing so is to use the Verilog code listed in FIG. 4. It will be evident to anyone skilled in the art that the code listed in FIG. 4 is a serial to parallel shift register. Furthermore, the BSHFT input can be used to control the input rate. If BSHFT is held asserted always, then the active ISR operates at the speed of the clock, which is 65 MB/s in the example embodiment. If the BSHFT is asserted on every other clock cycle, then the active ISR operates at half the speed of the clock, or 32 MB/s in the example embodiment. If the BSHFT is asserted on every fourth clock cycle, then the active ISR operates at one quarter the speed of the clock, or 16 MB/s in the example embodiment. Different active ISRs may operate at different data rates, depending on the data rate of the corresponding serial input stream, but each active ISR within an ISR group operates at the same data rate.

For each timeslot in turn, the data selector 24 reads data from the parallel input streams data from the active ISRs 26 and presents the data to the data memory 22 at a constant rate. The data selector 24 accomplishes this constant rate of data presentation by, for each ISR group, reading data from different active ISRs within the ISR group based on the input data rate of the associated grouped input stream, and then multiplexing data received from the different active ISRs. If the input data rate of a grouped input stream is the maximum data rate, there will be only one active ISR in the ISR group associated with the grouped input stream, and the data selector 24 reads data from only one parallel input stream of the grouped input stream. If the input data rate of a grouped input stream is half the maximum data rate, there will be two active ISRs in the ISR group associated with the grouped input stream, and the data selector 24 reads data from the two parallel input streams of the grouped input stream. If the input data rate of a grouped input stream is one quarter the maximum data rate, there will be four active ISRs in the ISR group associated with the grouped input stream, and the data selector 24 reads data from four parallel input streams of the grouped input stream. In one embodiment of the invention, the data selector 24 uses the Verilog code listed in FIG. 5 in order to present data to the data memory 22.

The data for each grouped input stream is stored in the data memory 22 in rows, each row corresponding to one grouped input stream and each cell in each row corresponding to one timeslot. From the description of the operation of the data selector 24 given above, it will be apparent to one skilled in the art that the data within the data memory 22 will have a data structure 90 as shown in FIG. 6. Each row of the data structure 90 corresponds to one grouped input stream. For purposes of illustration, the first row 92 of the data structure 90 corresponds to a grouped input stream having an input data rate equal to the maximum data rate, the second row 94 corresponds to a grouped input stream having an input data rate equal to half the maximum data rate, and the third row 96 corresponds to a grouped input stream having an input data rate equal to one quarter the maximum data rate. For the first grouped input stream, the data selector 24 has presented data from only one active ISR (designated by HRA(n), the parameter n indicating the timeslot number). The data for the first grouped input stream are stored sequentially by timeslot. For the second grouped input stream, the data selector 24 has presented data from two active ISRs. The data are stored sequentially by timeslot, but the data from the first active ISR (HRA(n)) and the data from the second active ISR (HRB(n)) are interleaved. For the third grouped input stream, the data selector 24 has presented data from four active ISRs. The data are stored sequentially by timeslot, but the data from all four active ISRs are interleaved.

An equal amount of data is stored in the data memory 22 for each grouped input stream, thereby taking full advantage of the available memory. Although there are fewer timeslots for each active ISR operating at data rates below the maximum data rate, there are more active ISRs per grouped input stream at the lower data rates and so the total number of timeslots per grouped input stream is the same. If no interleaving occurred, then for grouped input streams at half the maximum data rate only half of each corresponding row in the data structure 90 would be occupied, and for grouped input streams at one quarter the maximum data rate only one quarter of each corresponding row in the data structure 90 would be occupied.

The connection memory 28 stores connection addresses, indicating from where an outgoing signal for an active OSR is to be retrieved. In the preferred embodiment, the connection addresses are organized within the connection memory 28 in the same way as data is organized within the data memory 22. Referring to FIG. 7, a connection data structure 100 within the connection memory 28 is shown. Each row of the data structure 100 corresponds to one grouped output stream. For illustration purposes, the first row 102 of the data structure 100 corresponds to a grouped output stream having an output data rate equal to the maximum data rate, the second row 104 corresponds to a grouped output stream having an output data rate equal to half the maximum data rate, and the third row 106 corresponds to a grouped output stream having an output data rate equal to one quarter the maximum data rate. For the first grouped output stream, connection addresses are stored only for timeslots for one active OSR (designated SRCA(n), the parameter n indicating a timeslot number). The connection addresses for the first grouped output stream are stored sequentially by timeslot. For the second grouped output stream, connection addresses are stored for timeslots for two active OSRS, since the output data rate of the grouped output stream is half the maximum data rate and data within the grouped input stream can therefore be sent over two OSRs. The connection addresses are stored sequentially by timeslot, but the connection addresses of the first active OSR (SRCA (n)) and of the second active OSR (SRCB(n)) are interleaved. For the third grouped output stream, connection addresses are stored for timeslots for four active OSRs. The connection addresses are stored sequentially by timeslot, but the connection addresses for all four active OSRs are interleaved.

Figure 8:
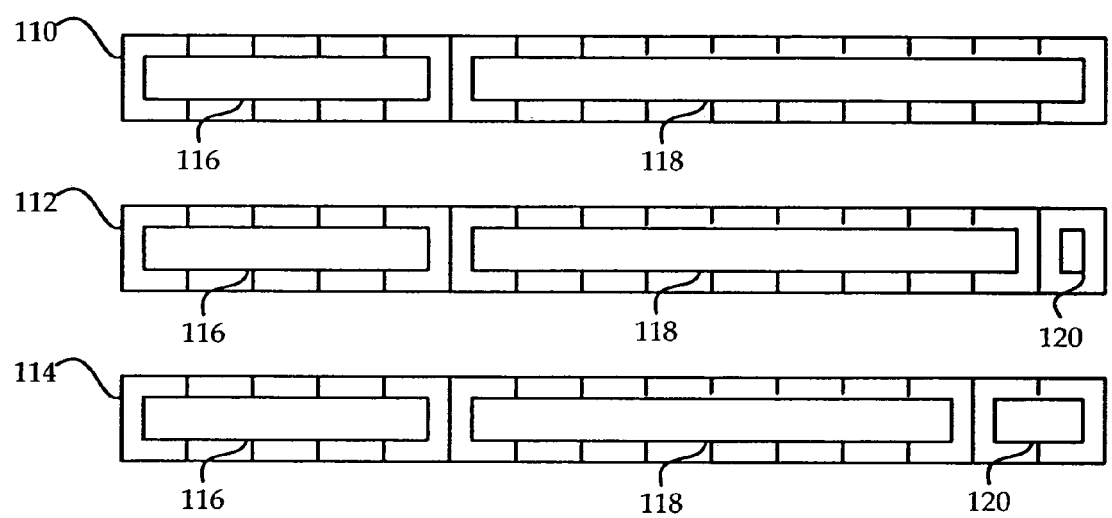
FIG. 8 is a diagram of data structures used to store individual connection addresses within the connection memory of FIG. 1 according to one embodiment of the invention.

In the example embodiment in which there are 32 streams, 1024 time slots in parallel input streams at the maximum data rate, and up to four active ISRs within each grouped input stream, each connection address is a 15 bit field. Referring to FIG. 8, connection address data structures 110, 112, and 114 are shown for parallel input streams having input data rates of the maximum data rate, one half the maximum data rate, and one quarter the maximum data rate respectively. A first set of bits 116 of the connection address data structures 110, 112, and 114 represents a grouped input stream number, and is 5 bits in length in the example embodiment of 32 grouped input streams. A second set of bits 118 of the connection address data structures 110, 112, and 114 represents a timeslot (or channel) number. In the example embodiment, the second set of bits 118 for a 65 MB/s data rate parallel input stream (connection address 110) is 10 bits in length and indicates a timeslot number between 0 and 1023; the second set of bits 118 for a 32 MB/s data rate parallel input stream (connection address 112) is 9 bits in length and indicates a timeslot number between 0 and 511; and the second set of bits 118 for a 16 MB/s data rate parallel input stream (connection address 114) is 8 bits in length and indicates a timeslot number between 0 and 255. A third set of bits 120 of the connection address data structures 112 and 114 identify a parallel input stream within a grouped input stream. There is no third set of bits for the connection address data structure for a maximum data rate parallel input stream since there is data from only one parallel input stream within the grouped input stream loaded into the data memory 22. In the example embodiment, the third set of bits 120 for a 32 MB/s data rate parallel input stream (connection address 112) is 1 bit in length and indicates a group number between 0 and 1; and the third set of bits 120 for a 16 MB/s data rate parallel input stream (connection address 114) is 2 bits in length and indicates a group number between 0 and 3.

It should be noted however that due to the method described above of populating the data memory 22, the connection address data structures for all three data rates are actually identical, each being a 15 bit field indicating an address within the data memory 22. The SSM 30 need not know the data rate of the parallel input stream corresponding to the connection address, if the SSM 30 uses the connection address to directly access the data structure 90 within the data memory 22.

Figure 9:
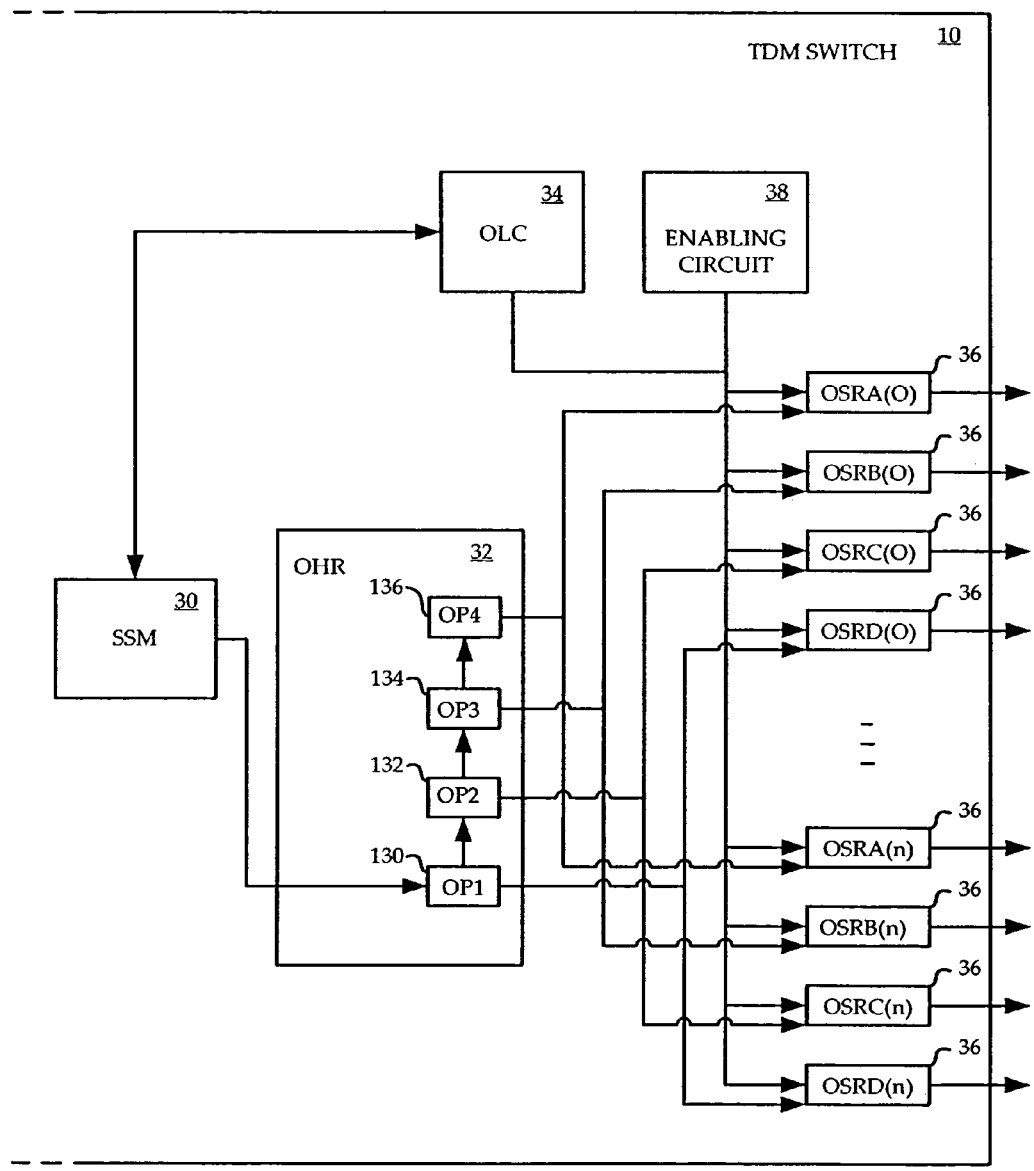
FIG. 9 is a more detailed block diagram of the output portion of the digital switch of FIG. 1 according to one embodiment of the invention.

Referring to FIG. 9, further details of the output side of the TDM digital switch 10 according to one embodiment of the invention are shown. The OHR 32 includes a pipe having four stages 82, 84, 86, and 88, 130, 132, 134, and 136, each stage corresponding to one OSR within each OSR group. As a new set of data bytes (one byte for each of the n grouped output streams) is received by the OHR 32 at each timeslot, data bytes already in the OHR 32 are passed down the pipe. All the data bytes (one data byte for each of the n grouped output stream) in the first stage 130 are passed to the second stage 132, the data bytes in the second stage 132 are passed to the third stage 134, and the data bytes in the third stage 134 are passed to the fourth stage 136. Referring to FIG. 10, a listing of Verilog code by which the OHR 32 receives data bytes and populates the stages of the pipe according to the preferred embodiment of the invention is shown. The data bytes in each stage are then presented to the corresponding OSRs. Each of the n data bytes in the fourth stage 136 is passed to a corresponding first OSR in an OSR group corresponding to the grouped output stream to which the data byte corresponds. Similarly, each of the n data bytes in the third stage 134 is passed to a corresponding second OSR, each of the n data bytes in the second stage 132 is passed to a corresponding third OSR, and each of the n data bytes in the first stage 130 is passed to a corresponding fourth OSR. Each OSR thereby receives a data byte every timeslot.

The OLC 34 passes output control signals to the OSRs 36 once per timeslot. The output control signals include a load enable signal containing one load enable bit for each OSR group. Each OSR within an OSR group receives the same load enable bit. For each OSR group, the OLC 34 generates the load enable bit based on the output data rate of the associated grouped output stream. If the output data rate is the maximum data rate, the OLC 34 sets the load enable bit to an "on" value at the start of each timeslot. If the output data rate is half the maximum data rate, the OLC 34 sets the load enable bit to an "on" value at the start of every second timeslot. If the output data rate is one quarter the maximum data rate, the OLC 34 sets the load enable bit to an "on" value at the start of every fourth timeslot. Each load enable bit indicates to each of the corresponding OSRs when to start reading data from the OSR's corresponding stage in the pipe of the OHR 32.

The output control signals also include a shift enable signal containing one shift enable bit for each OSR group. Each OSR within an OSR group receives the same shift enable bit. For each OSR group, the OLC 34 generates the shift enable bit based on the output data rate for the corresponding grouped output stream. The shift enable bits act in the same way as the BSHFT value used to control serial to parallel conversion at different data rates at the ISRS. If the output data rate is the maximum data rate, the OLC 34 sets the shift enable bit to an "on" value constantly. If the output data rate is half the maximum data rate, the OLC 34 sets the shift enable bit to an "on" value every other clock cycle. If the output data rate is one quarter the maximum data rate, the OLC 34 sets the shift enable bit to an "on" value every fourth timeslot.

Referring to FIG. 11, a listing of Verilog code by which the OLC 34 generates load enable signals and shift enable signals according to one embodiment of the invention is shown. Load enable bits are contained within the 32 bit value LDen[31:0], there being 32 OSR groups in the example embodiment, and shift enable bits are contained within the 32 bit value SHFTen [31:0]. Referring to FIG. 12, a listing of Verilog code by which the OSRs 32 read data from the OHR 32 using output control signals from the OLC 34 is shown.

Returning to FIG. 9, an enabling circuit 38 is coupled to each OSR 36. The enabling circuit 38 sends group enable signals to turn off and on transmission of any output serial data from the second, third, and fourth OSRs in various OSR groups, depending on the output data rate of the OSR group. In one embodiment, the enabling circuit generates the group enable signals such that for each group enable stream, the group enable signal indicates to a number of OSRs associated with the grouped output stream to transmit data, wherein the number of OSRs which are instructed to transmit data being such that the sum of the outwit data rates of the OSRs is equal to the maximum data rate. Referring to FIG. 13, a listing of Verilog code by which the enabling circuit generates group enable signals according to one embodiment of the invention is shown. Group enable signals are asserted high to enable the respective OSRs within an OSR group, and asserted low to disable or tri-state the respective OSRs within an OSR group. It is to be noted that there are often other tri-state signals, not mentioned in this disclosure, that are used to control stream and channel operation. The group enable signals generated by the enabling circuit 38 are gated such that any disabling of a second, a third, or a fourth OSR within an OSR group by the enabling circuit 38 overrides any other tri-state signals.

Figure 14:
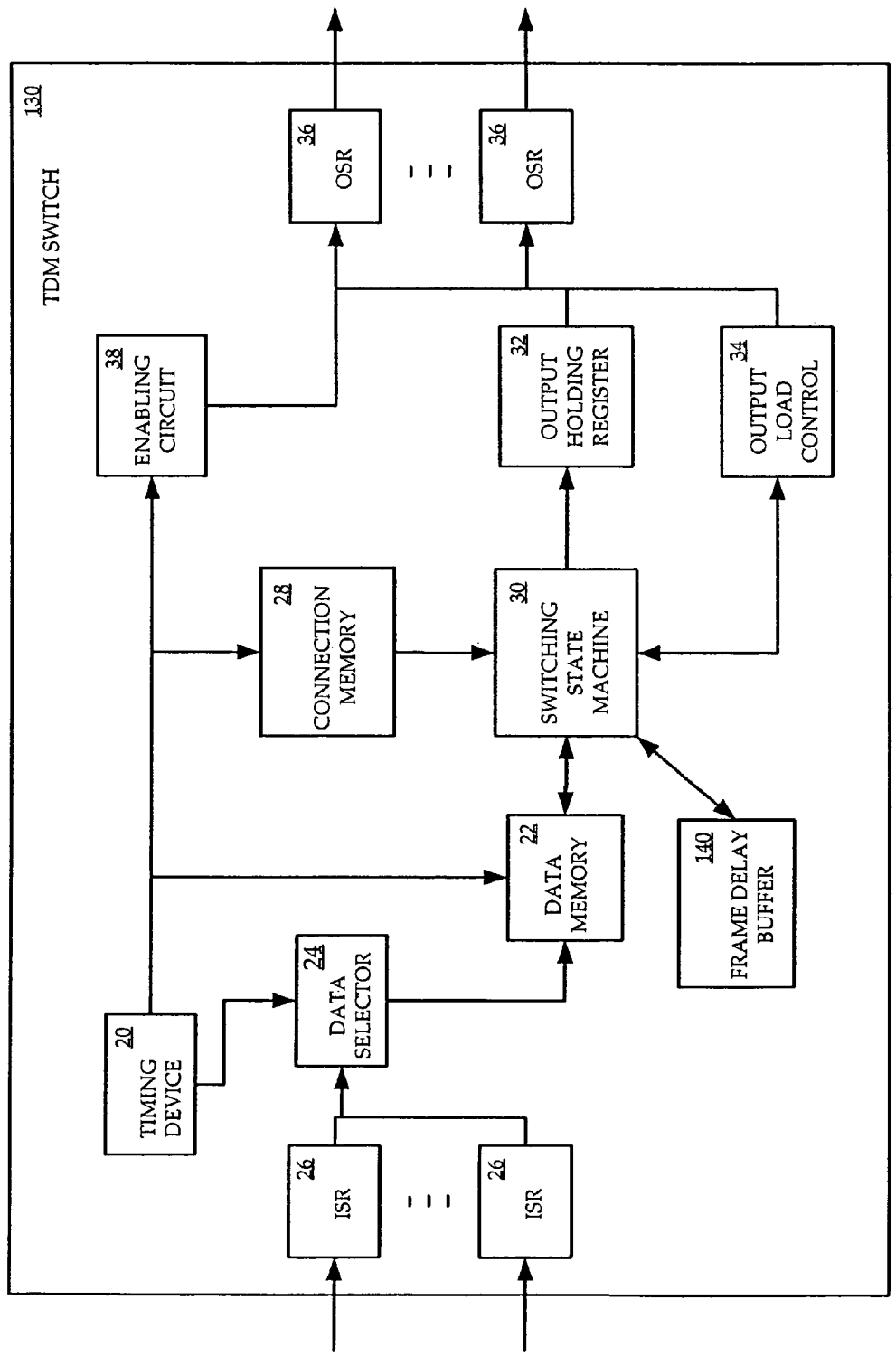
FIG. 14 is a block diagram of a TDM digital switch according to another embodiment of the invention.

In some implementations, it may be desirable to implement a constant delay feature. Referring to FIG. 14, a TDM digital switch 130 according to another embodiment of the invention is shown. The TDM digital switch 130 shown in FIG. 14 is similar to the TDM digital switch 10 described above with reference to FIG. 1, but in addition includes a Frame Delay Buffer Memory 140 for effecting a constant delay feature.

Use of only some of the I/O pins in some circumstances may appear to be wasteful of I/O pins. As an example, if all the input pins and output pins are operating at the maximum data rate, three quarters of the I/O pins will remain unused. However, large switches of this nature are largely core bound. This means that the area of the silicon is fixed by the logic and memory required to implement the switch, rather than by the number of I/O pads needed. In addition, the minimum size of the package is limited by the required power dissipation. For these reasons, the additional unused I/O capability does not make much difference to the cost of the device.

Numerous variations of the invention are viewed as being within the scope of the invention. For example, if a frame delay is desired, other methods of implementing a frame delay than that described above with reference to FIG. 14 may be used.

Different numbers of channels and streams may be used, and different bit rates may be used. Different numbers of ISRs in each ISR group, of OSRs in each OSR group, and of stages in the OHR pipe may be used. Generally, the number of ISRs and OSRs in each ISR group and OSR group respectively will be defined as the maximum date data rate divided by a lowest programmable data rate. The number of stages in the OHR pipe will be equal to the number of OSRs in each OSR group. For example, a programmable data rate of 8 MB/s could be added to the example embodiment, in which case eight ISRs would be in each ISR group, and each grouped input stream associated with an input data rate of 8 MB/s would comprise eight multiplexed parallel input streams. The TDM digital switch would have 256 input pins and 256 output pins, 32 of which would be in use when all streams are operating at 65 MB/s and all of which would be in use when all streams are operating at 8 MB/s.

Data may be stored in the data memory 22 using a different data structure than that shown in FIG. 6. However, the convenience of using a connection address from the connection memory directly as a memory address may be lost.

The embodiments presented are exemplary only and persons skilled in the art would appreciate that variations to the above described embodiments may be made without departing from the spirit of the invention. The scope of the invention is solely defined by the appended claims.

I claim:

1. A method of switching a plurality of parallel input Time Division Multiplexing (TDM) streams to a plurality of parallel output TDM streams, each parallel input TDM stream having an input data rate not greater than a maximum data rate, the method comprising the steps of:
   a. grouping the parallel input TDM streams into a plurality of subsets, the parallel input TDM streams in each subset having a common input data rate associated with the subset, at least one subset having an input rate less than the maximum data rate and less than the input data rate of at least one other parallel input stream;
   b. multiplexing, by a data selector, the parallel input TDM streams within each subset having an input data rate less than the maximum data rate to generate a respective grouped input stream;
   c. storing within a data memory data from each grouped input stream in a separate row of the data memory in the order in which the data occurs within the grouped input stream;
   d. determining a mapping between the parallel input TDM streams and the parallel output TDM streams;
   e. generating by a switching state machine a plurality of grouped output streams from the mapping such that each grouped output stream includes data from at least one parallel input TDM stream; and
   f. demultiplexing, by an output holding register, each grouped output stream which includes data from at least two parallel input TDM streams to generate a respective plurality of parallel output TDM streams.

2. The method of claim 1 further comprising the steps of:
   a. receiving a plurality of serial input TDM streams;
   b. generating each parallel input stream from a corresponding one of the serial input TDM streams;
   c. for each parallel output TDM stream, generating a respective serial output TDM stream; and
   d. transmitting the plurality of serial output TDM streams.

3. The method of claim 1 wherein each grouped input stream has an internal data rate defined as the sum of the input data rates of all the parallel input TDM streams used to generate the grouped input stream, and equal to the maximum data rate.

4. The method of claim 1 wherein the step of grouping the parallel input TDM streams into a plurality of subsets comprises grouping parallel input TDM streams into the plurality of subsets such that the sum of the input data rates of all parallel input TDM streams in each subset is equal to the maximum data rate.

5. The method of claim 1 wherein the input data rate of each parallel input TDM stream is one of a set of programmable data rates.

6. The method of claim 5 wherein the set of programmable data rates consists of data rates forming a geometric series.

7. The method of claim 6 wherein the set of programmable data rates includes the data rates 65 MB/s, 32 MB/s, and 16 MB/s.

8. A time division multiplexing (TDM) digital switch adapted to receive a plurality of serial input TDM streams and to transmit a plurality of serial output TDM streams, each serial input TDM stream having a respective input data rate not greater than a maximum data rate, the TDM digital switch comprising:
   a. a plurality of input shift registers, each for receiving a corresponding one of the serial input TDM streams and generating a corresponding parallel input stream, each parallel input stream belonging to one of a plurality of parallel input stream subsets (PIS subsets);
   b. a plurality of output shift registers, each for receiving a corresponding parallel output stream and transmitting a corresponding one of the serial output TDM streams at a respective output data rate
   c. a data selector for multiplexing the parallel input streams in each PIS subset which includes more than one parallel input stream, to generate a corresponding grouped input stream, each grouped input stream thereby being associated with one of the PIS subsets;
   d. a data memory, wherein the data selector populates the data memory by storing data from each grouped input stream in a separate row of memory, in the order in which the data occurs within the grouped input stream;
   e. means for generating at least one grouped output stream, each grouped output stream including data from at least two of the parallel input streams; and
   f. means for demultiplexing each grouped output stream to generate a subset of parallel output streams, thereby associating each output shift register with one of the grouped output streams.

9. The TDM digital switch of claim 8 wherein each input shift register is adapted to receive the corresponding serial input TDM stream at one of a set of programmable data rates, and wherein each output shift register is adapted to transmit the corresponding serial output TDM stream at one of the set of programmable data rates.

10. The TDM digital switch of claim 9 wherein the set of programmable data rates includes 65 MB/s, 32 MB/s, and 16 MB/s.

11. The TDM digital switch of claim 8 wherein the data selector is adapted to generate each grouped input stream such that the sum of the input data rates of all parallel input streams within the PIS subset associated with the grouped input stream is equal to the maximum data rate.

12. The TDM digital switch of claim 11 wherein the data selector is adapted to multiplex the parallel input streams by time division multiplexing the parallel input streams in each PIS subset, each parallel input stream in a PIS subset having a common input data rate corresponding to the PIS subset, thereby populating each grouped input stream with data from each parallel input stream in turn for each of a plurality of timeslots.

13. The TDM digital switch of claim 12 wherein the means for generating at least one grouped output stream comprises:
   a. a connection memory for storing a respective connection address for each timeslot and for each output shift register; and
   b. a switching state machine for, for each grouped output stream, retrieving data from the data memory as indicated by the connection address associated with a current timeslot and each output shift register associated with the grouped output stream.

14. The TDM digital switch of claim 13 wherein the connection memory stores connection addresses for each grouped output stream in a separate row of memory, for each parallel output stream associated with the grouped output stream in turn, for each of the plurality of timeslots.

15. The TDM digital switch of claim 14 wherein the means for demultiplexing grouped output streams comprise:
   a. a plurality of ordered stages within a pipe; and
   b. means for periodically: receiving data from each grouped output stream and storing the data in the first stage; transferring data between stages within the pipe as specified by the ordering of the stages; and transferring data for each grouped output stream from each stage to an output shift register corresponding to the stage and to the grouped output stream.

16. The TDM digital switch of claim 15 further comprising an enabling circuit for periodically generating a group enable signal to indicate to each output shift register whether to transmit data.

17. The TDM digital switch of claim 16 wherein the enabling circuit is adapted to generate the group enable signal such that for each grouped output stream, the group enable signal indicates to a number of output shift registers associated with the grouped output stream to transmit data, the number of output shift registers being such that the sum of the output data rates of the output shift registers is equal to the maximum data rate.

18. The TDM digital switch of claim 8 further comprising an enabling circuit for periodically generating a group enable signal to indicate to each output shift register whether to transmit data.

19. The TDM digital switch of claim 18 wherein the enabling circuit is adapted to generate the group enable signal such that for each grouped output stream, the group enable signal indicates to a number of output shift registers associated with the grouped output stream to transmit data, the number of output shift registers being such that the sum of the output data rates of the output shift registers is equal to the maximum data rate.

* * * * *